UNITED STATES PATENT OFFICE.

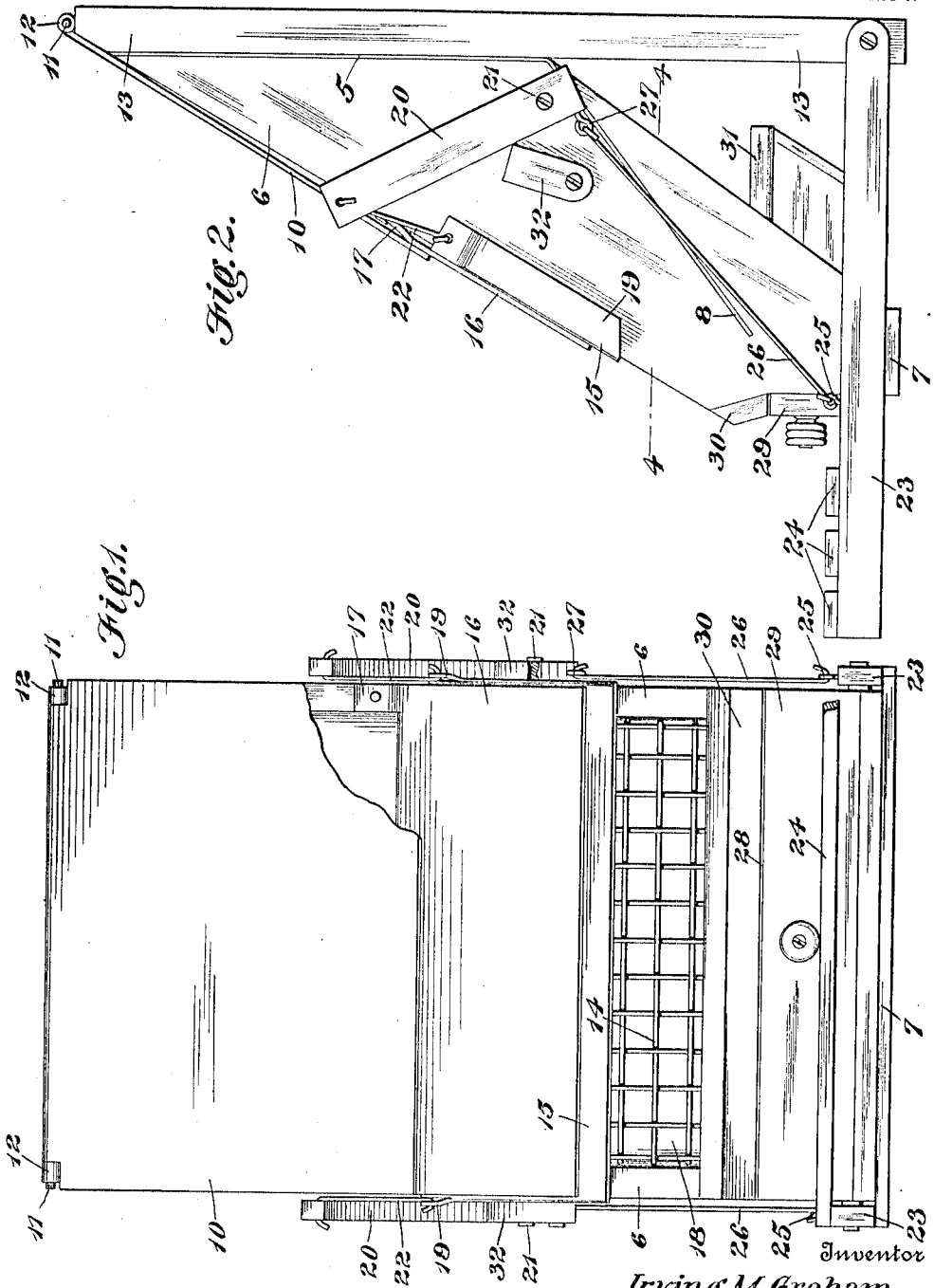

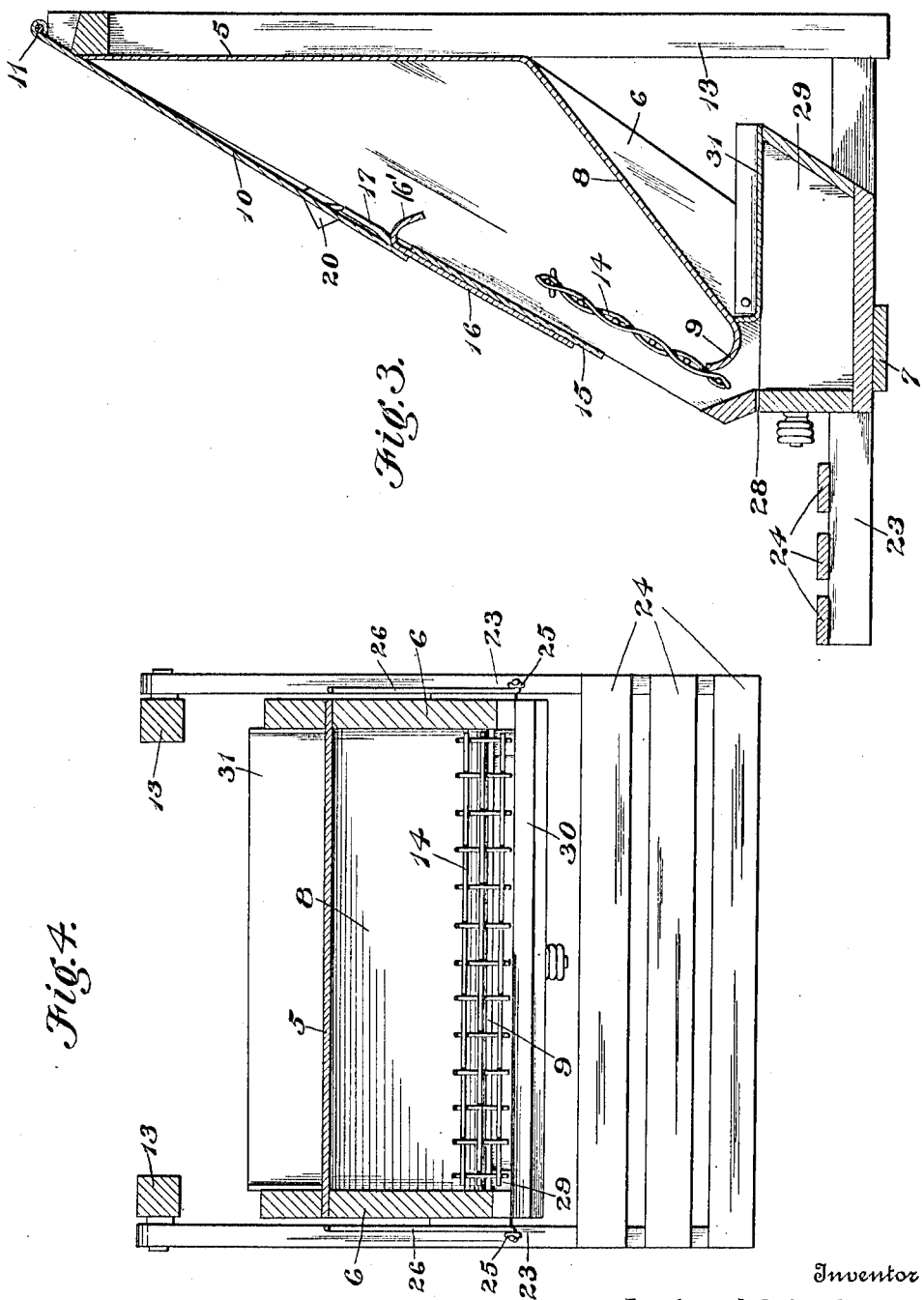

IRVING M. GRAHAM, OF CANDIA, NEW HAMPSHIRE.

POULTRY-FEEDING DEVICE.

1,080,436. Specification of Letters Patent. Patented Dec. 2, 1913.

Application filed June 4, 1912. Serial No. 701,615.

*To all whom it may concern:*

Be it known that I, IRVING M. GRAHAM, a citizen of the United States, residing at Candia, in the county of Rockingham and State of New Hampshire, have invented new and useful Improvements in Poultry-Feeding Devices, of which the following is a specification.

The invention relates to poultry feeders.

The primary object of the invention is the provision of a feeder of this character wherein the feed will gravitate to a trough so that the same may be picked up by the poultry the surplus feed ordinarily wasted being caught into a receiver or drawer, thereby preventing the loss of the feed, the trough being protected within the inclosure by a sliding door or gate from moisture, rain, dirt, rats, mice, or the like.

Another object of the invention is the provision of a poultry feeder of this character which will prevent the loss or waste of the feed when the poultry is pulling out the feed from the trough with their bills and also which will be thoroughly sanitary and waterproof.

A still further object of the invention is the provision of a poultry feeder of this character which is simple in construction, thoroughly reliable and efficient in its operation, and inexpensive in manufacture.

With these and other objects in view the invention consists in the construction, combination and arrangement of parts as will be hereinafter more fully described, illustrated in the accompanying drawings, and pointed out in the claim hereunto appended.

In the drawings:—Figure 1 is a front elevation of a poultry feeder constructed in accordance with the invention. Fig. 2 is a side elevation thereof. Fig. 3 is a vertical longitudinal sectional view through the same. Fig. 4 is a sectional view on the line 4—4 of Fig. 2.

Similar reference characters indicate corresponding parts throughout the several views in the drawings.

Referring to the drawings by numerals, the poultry feeder comprises a forwardly inclined reservoir having a rear wall 5, end wall 6, and a bottom 7, the rear wall 5 being formed with an inwardly extending forwardly inclined chute 8 terminating in a trough 9, interiorly of the reservoir while the upper half portion of the open front of the reservoir is closed by a hinged lid 10, the pintle 11 thereof being journaled in bearings 12 mounted on the upper ends of vertical legs 13 fixed to the rear side of the reservoir, the lower ends of the legs 13 and the main bottom 7 being adapted to rest upon a foundation or the ground and in this manner the reservoir is supported in its upright position.

Arranged interiorly of the reservoir and extending from the bottom of the trough upwardly for a considerable distance is a foraminous partition or screen 14 which prevents the scattering of the feed when the reservoir is filling with feed, the said feed gravitating into the trough 9 for the filling of the same.

Slidably mounted upon the reservoir and adapted to traverse the lower open front half thereof is a gate or door 15, the same working beneath the shoulder plate 16 which latter is formed with suspended ears 17 fixed to the front edges of the end walls 6 for the mounting of the plate 16 on the reservoir, the said plate 16 being of a size to afford a feed opening 18 designed to be normally closed by the door or gate 15 when in lowered position. The door or gate 15 at opposite ends is formed with right-angular flanges 19 which overlap the end walls 6 and prevent lateral displacement of the gate or door when being opened or closed. The shoulder plate 16 is formed with an inwardly and downwardly bent flange 16' which is designed to deflect the feed held within the reservoir away from the slide or gate 15, and in this manner preventing the said feed from falling between the screen 14 and the said gate 15.

Mounted upon the end walls 6 exteriorly thereof are swinging levers 20, the same being supported upon pivots 21 fixed in the end wall, the rear ends of the levers being connected to the said pivot whereby said levers will swing vertically, and to the opposite free ends of these levers are connected links 22, the same being loosely connected to the flanges 19 on the door or gate 15, so that upon movement of the levers vertically in one direction, the door or gate will be shifted to open position and on the lowering of the levers the said gate or door will close.

Mounted upon the legs 13 are the side arms 23 of a tread platform 24, the latter being projected beyond the front of the reservoir, and has mounted in the side arms 23 eye members 25 to which are loosely connected pull rods 26, the same being also loosely connected to eye members 27 fixed in the lower edges of the levers 20 near the rear ends thereof, and spaced rearwardly of the pivots 21 connecting them to the end walls 6 of the reservoir.

On a fowl stepping upon the platform 25 the weight of the fowl will exert a downward pressure upon the platform causing the swinging of the levers 20 upwardly and thereby opening the door or gate 15 so that access may be had to the feed trough 9 through the feed opening 18 to permit the fowl to pick up the grain or other feed contained within the trough. When the fowl jumps from the platform 24, the weight of the door or gate 15 will cause it to gravitate to closed position thereby closing the feed opening 18 of the front of the reservoir, in this manner protecting the feed contained therein to prevent dust, dirt, water, or the like entering the reservoir. It will also be apparent that the reservoir when closed will not permit the entrance of rats, mice or the like therein.

Formed in the lower portion of the reservoir is a drawer guideway or opening 28 in which is slidably fitted a drawer 29, the latter being positioned immediately below the feed trough 9, which is spaced from the front cross rail 30 separating the drawer opening 28 from the feed opening 18, so that feed being pulled out with the bills of the poultry will drop through the space between the trough 9 and the rail 30 into the drawer 29 and in this manner preventing the waste of the feed.

Fixed to the end wall 6 of the reservoir and projecting rearwardly therefrom directly above the rear portion of the drawer 29 is a closure plate or shield 31 which closes the rear end portion of the drawer and prevents access being had thereto at the rear of the reservoir when the drawer is in closed position. Pivotally connected exteriorly to the end walls 6 are turning keepers 32 which when swung upwardly will engage the levers 20 so as to suspend the same elevated and thereby hold the door or gate 15 against closing movement for permitting free access to be had to the feed trough 9 for extracting the feed therefrom.

From the foregoing description, taken in connection with the accompanying drawings, it is thought that the construction and operation of the invention will be clearly understood, and therefore, a more extended explanation has been omitted.

What is claimed is:—

A poultry feeder comprising a forwardly inclined reservoir having an inwardly extending forwardly inclined chute provided with an upwardly curled lower edge forming a trough interiorly of said reservoir, a screen connected with the reservoir at a point above the trough and extended downwardly to contact therewith, the said reservoir being provided with an open front, a gate swingingly connected to the reservoir for closing the upper portion of the open front, a slide mounted upon the reservoir and movable for opening and closing the lower portion of the open front, a plate mounted upon the reservoir and overhanging the said slide, and an inwardly and downwardly bent flange formed on the upper edge of the said plate and adapted to deflect the feed within the reservoir to prevent the falling of the same between the slide and the said screen.

In testimony whereof I affix my signature in presence of two witnesses.

IRVING M. GRAHAM.

Witnesses:
J. H. OAKES,
G. H. McDUFFER.

Copies of this patent may be obtained for five cents each, by addressing the "Commissioner of Patents, Washington, D. C."